United States Patent
Moine-Picard et al.

(10) Patent No.: US 8,196,691 B2
(45) Date of Patent: Jun. 12, 2012

(54) ARRANGEMENT FOR MOUNTING A BATTERY IN A MOTOR VEHICLE

(75) Inventors: Thierry Moine-Picard, Bailly (FR);
Stephane Mullard, Le Port Marly (FR);
Stephane Josse, Le Mesnil Saint Denis (FR)

(73) Assignee: Renault S.A.S., Boulogne-Billancourt (FR)

( * ) Notice: Subject to any disclaimer, the term of this patent is extended or adjusted under 35 U.S.C. 154(b) by 182 days.

(21) Appl. No.: 12/668,049

(22) PCT Filed: Jul. 1, 2008

(86) PCT No.: PCT/FR2008/051211
§ 371 (c)(1),
(2), (4) Date: Apr. 19, 2010

(87) PCT Pub. No.: WO2009/007632
PCT Pub. Date: Jan. 15, 2009

(65) Prior Publication Data
US 2010/0193271 A1 Aug. 5, 2010

(30) Foreign Application Priority Data
Jul. 9, 2007 (FR) ...................................... 07 56332

(51) Int. Cl.
*B60R 16/04* (2006.01)
(52) U.S. Cl. ...................................................... 180/68.5
(58) Field of Classification Search .................. 180/68.5
See application file for complete search history.

(56) References Cited

U.S. PATENT DOCUMENTS

| | | | | |
|---|---|---|---|---|
| 2,306,833 A | * | 12/1942 | Thannhauser | 180/68.5 |
| 2,588,870 A | * | 3/1952 | Pittman | 180/68.5 |
| 2,613,755 A | * | 10/1952 | Newby et al. | 180/68.5 |
| 3,821,996 A | * | 7/1974 | Hollins | 180/68.5 |
| 4,216,839 A | * | 8/1980 | Gould et al. | 180/65.1 |
| 4,976,327 A | * | 12/1990 | Abujudom et al. | 180/68.2 |
| 5,082,075 A | * | 1/1992 | Karolek et al. | 180/68.2 |
| 5,115,116 A | | 5/1992 | Reed | |
| 5,301,765 A | * | 4/1994 | Swanson | 180/68.5 |
| 6,508,322 B2 | * | 1/2003 | Dignitti et al. | 180/68.5 |
| 6,827,168 B2 | * | 12/2004 | Miyazaki | 180/68.5 |
| 2003/0168888 A1 | * | 9/2003 | Decker et al. | 296/198 |

FOREIGN PATENT DOCUMENTS

| | | |
|---|---|---|
| EP | 1 182 092 | 2/2002 |
| EP | 1 308 335 | 5/2003 |

* cited by examiner

*Primary Examiner* — J. Allen Shriver, II
*Assistant Examiner* — Erez Gurari
(74) *Attorney, Agent, or Firm* — Oblon, Spivak, McClelland, Maier & Neustadt, L.L.P.

(57) ABSTRACT

An arrangement for mounting an accumulator battery in a motor vehicle that includes a first body structure part that forms an engine compartment, in which the first structure part includes at least two substantially longitudinal and parallel side members and which is positioned to the rear of a second, a transverse structure part that forms the front filler panel of the vehicle, in which the transverse structure part includes at least one front cross member connected to the side members and supporting at its ends a light-projecting member including bulbs that are accessible from the engine compartment via at least one opening, and in which a support accommodating the accumulator battery is located to the rear of this opening. The accumulator-battery support includes a removable part providing access to the opening of the light-projecting member from the engine compartment so that dead bulbs can be changed leaving the support in position.

8 Claims, 3 Drawing Sheets

ARRANGEMENT FOR MOUNTING A BATTERY IN A MOTOR VEHICLE

The present invention relates to an arrangement for mounting a battery in a motor vehicle. The invention relates more particularly to an arrangement for mounting an accumulator battery in a motor vehicle which comprises a first body structure portion forming an engine compartment, of the type in which the structure portion comprises at least two generally longitudinal and parallel side members and which is arranged to the rear of a transverse structure portion forming a front fender of the vehicle, of the type in which the transverse structure comprises at least one front crossmember connected to the side members and supporting at each of its ends a headlight unit of which the bulbs are accessible from the engine compartment by at least one opening and in which a compartment accommodating the accumulator battery is located to the rear of this opening.

PRIOR ART

Many examples of arrangements of this type are known. In most of these arrangements the battery is rigidly attached to the compartment which carries it. A conventional battery is often mounted in a sealed housing in which a current of air is produced so as to cool the battery itself. The shape of this housing is parallelepipedic and the sealing of it is obtained by the addition of a cover closing the top of the housing.

In the engine compartment of a motor vehicle, the accumulator battery and its housing are usually located behind the lighting unit. This lighting unit comprises all of the signaling lights of the vehicle and frequently requires a change of the defective bulbs of the signaling lights. The proximity of the lighting unit to the housing of the battery often prevents the user from gaining access to it easily. In fact, the size of the engine compartment constrains the user to use special tooling to remove the component which is just behind the lighting unit or go to a garage to carry out the repair, which renders the operation very costly.

EXPLANATION OF THE INVENTION

To overcome these disadvantages, the invention provides an arrangement of the type previously described which allows the user, if a bulb in the headlight unit needs to be changed, to do this task intuitively himself, without requiring additional tools or work at the garage.

With this aim in view, the invention provides an arrangement of the type previously described, characterized in that the accumulator compartment comprises a removable portion allowing access to the opening in the headlight unit from the engine compartment to change the dead bulbs while keeping the compartment in place.

According to other features of the invention:
the compartment for the accumulator battery is generally parallelepipedic in shape, to which is attached a cover through the top of the first structure portion forming an engine compartment;
the removable portion is composed of at least one generally vertical face of the accumulator battery compartment;
the removable portion is composed of at least one portion with two faces connected to each other by one edge of the parallelepipedic compartment for the accumulator battery;
the removable portion of the compartment for the accumulator battery moves from an engaged position to a disengaged position by a generally vertical sliding movement toward the top of the vehicle and is replaced in position on the compartment by a generally vertical sliding movement toward the bottom of the vehicle;
the removable portion is mounted on at least one slide rail supported by one of the generally vertical pillars of the fixed portion of the compartment for the accumulator battery; and
the compartment for the accumulator battery comprises in its lower portion a groove accepting the profile of the removable portion, the assembly providing the sealing when the removable portion is in the engaged position.

The present invention relates moreover to a method for changing a bulb of a headlight unit in which a compartment for an accumulator battery is positioned close behind the headlight unit of a motor vehicle, characterized in that it includes the following steps:
open the hood of the vehicle;
remove the upper cover of the compartment for the accumulator battery providing the sealing of said compartment;
slide the removable portion of the battery compartment in at least one of the slide rails of the vertical pillars of the compartment with a generally vertical movement;
unblock the opening in the headlight unit from the rear of the transverse structure;
change one of the bulbs in the headlight unit from the rear opening;
carry out all of the preceding steps in the reverse order to return to the initial state.

DESCRIPTION OF THE FIGURES

Other features and advantages of the invention will emerge on reading the detailed description which follows, which is purely illustrative and non-limiting, and for the understanding of which reference will be made to the attached drawings, in which.

DETAILED DESCRIPTION OF PREFERRED EMBODIMENTS OF THE INVENTION

In the description which follows, the same reference numbers identify parts which are the same or those having similar functions.

Figure 1:
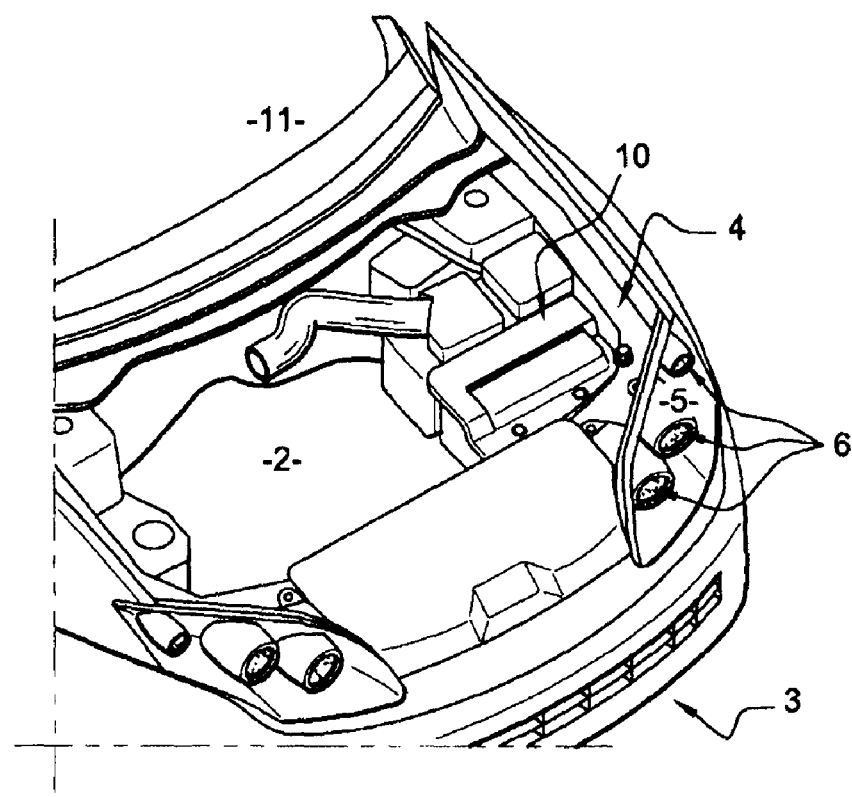
FIG. 1 is a general view in perspective of a first body structure portion forming an engine compartment arranged to the rear of a transverse structure portion forming a front fender of the vehicle according to the invention.

Illustrated in FIG. 1 is a first body structure portion 2 forming an engine compartment. The portion 2 lies in front of a cell 11 forming a passenger compartment of the vehicle. In a known manner, the body structure portion 2 comprises two generally longitudinal and parallel side members (not illustrated) supporting the various components of the engine compartment 2.

Figure 2:
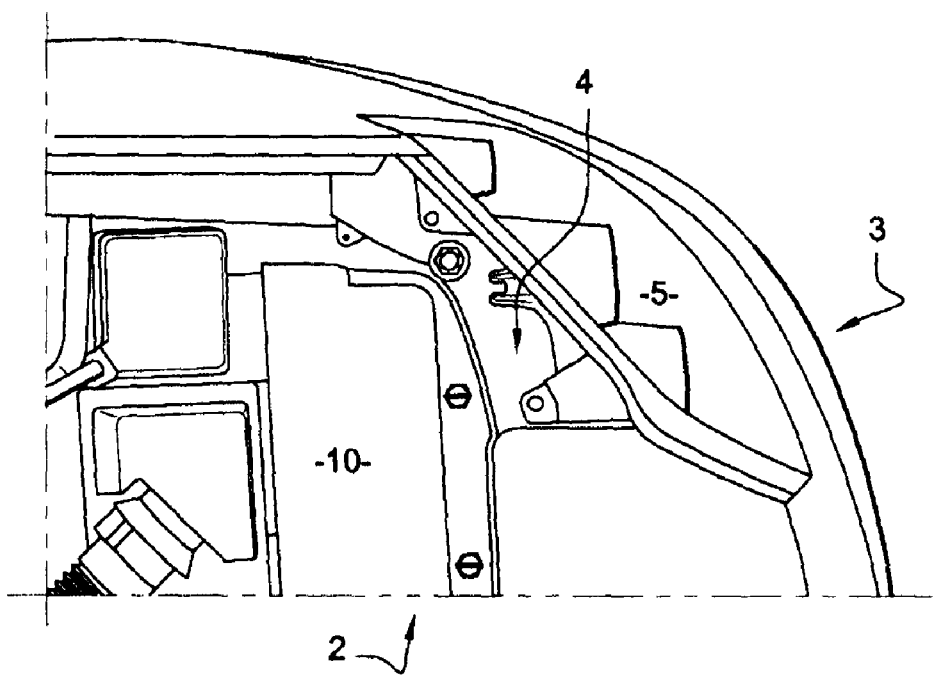
FIG. 2 is a schematic top view illustrating the position of the compartment for an accumulator battery located in the engine compartment behind a front fender supporting a lighting unit and in which the upper cover of the compartment is in the engaged position.

In a known manner, a battery compartment 8 is partly connected to one of the side members and accommodates an accumulator battery 1. The compartment 8 is generally parallelepipedic in shape and is covered by an upper cover 10 providing the sealing of the compartment, as FIG. 2 shows. The compartment 8 provides moreover the cooling of the battery by allowing a current of fresh air to pass through the interior of the compartment 8 accommodating the accumulator battery 1. In this way, the performance of the battery 1 is maintained during the operating phases of the vehicle.

The figure illustrates part of the engine compartment 2 and of a second structure portion 3 forming a front fender of the vehicle. This second structure portion 3 comprises a front crossmember 4 connected to the two side members of the engine compartment 2. This front crossmember 4 supports several technical components of the vehicle and in particular the lighting units 5 usually located at the ends of the crossmember 4. This lighting unit 5 is equipped with at least one headlight fitted with a bulb 6 oriented toward the front of the vehicle so as to illuminate the roadway ahead of the user when the visibility is reduced.

FIG. 2 emphasizes the proximity of the various components of the vehicle to each other. That is due to the optimization of the space in the engine compartment 2 to meet the growing need to install more systems in the vehicle. The present invention proposes to solve the technical problem to allow the user to change at least one bulb 6 of the unit 5 from the engine compartment 2 while leaving in place all the related devices.

Figure 3:
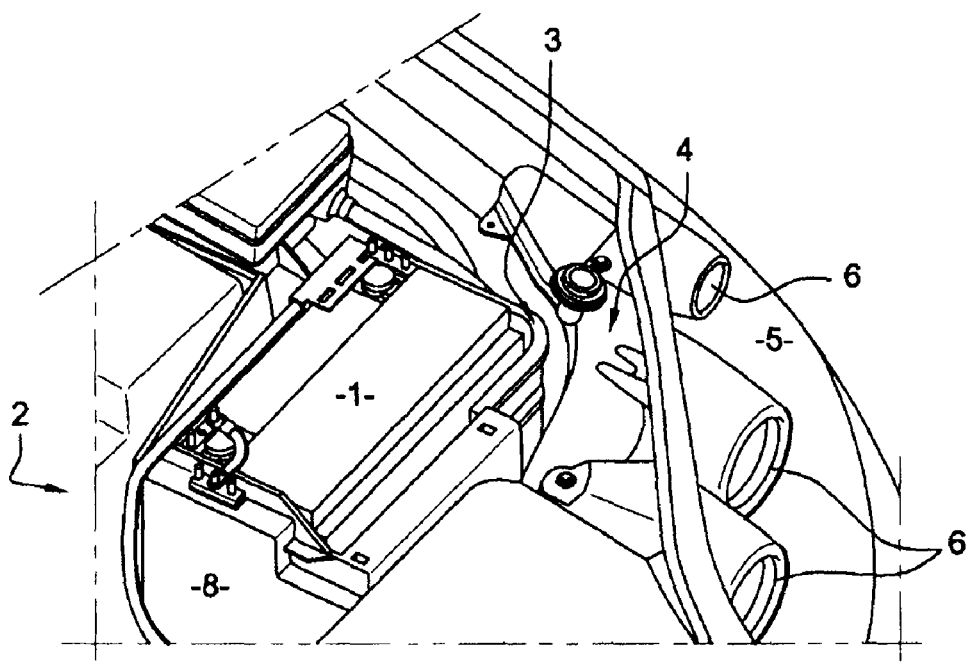
FIG. 3 is a detail view in perspective of the battery compartment of which the upper cover has been removed.
Figure 4:
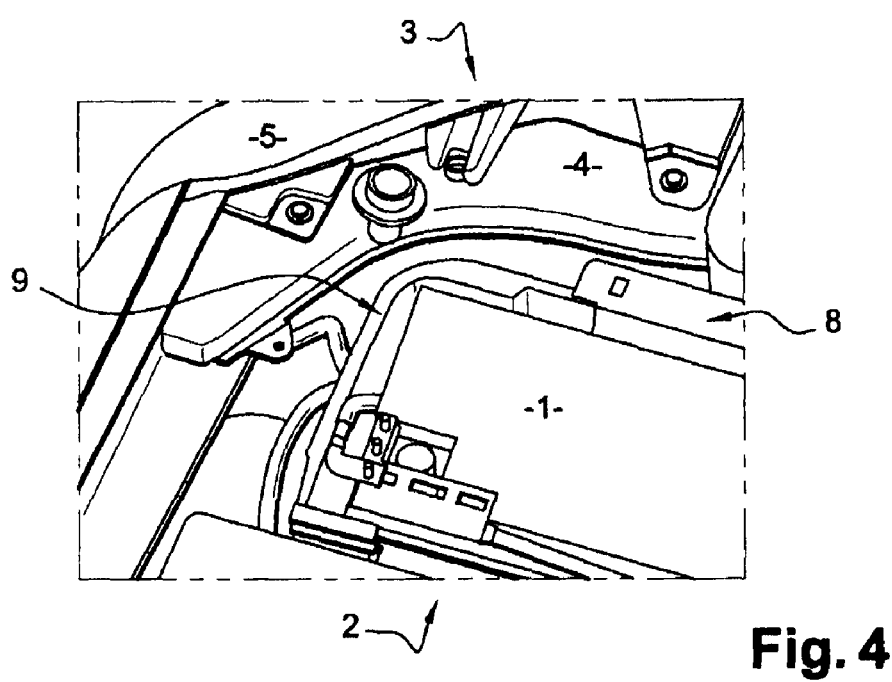
FIG. 4 is a detail view in perspective of the battery compartment of which a removable portion forming a partition of said compartment is in the engaged position.
Figure 5:
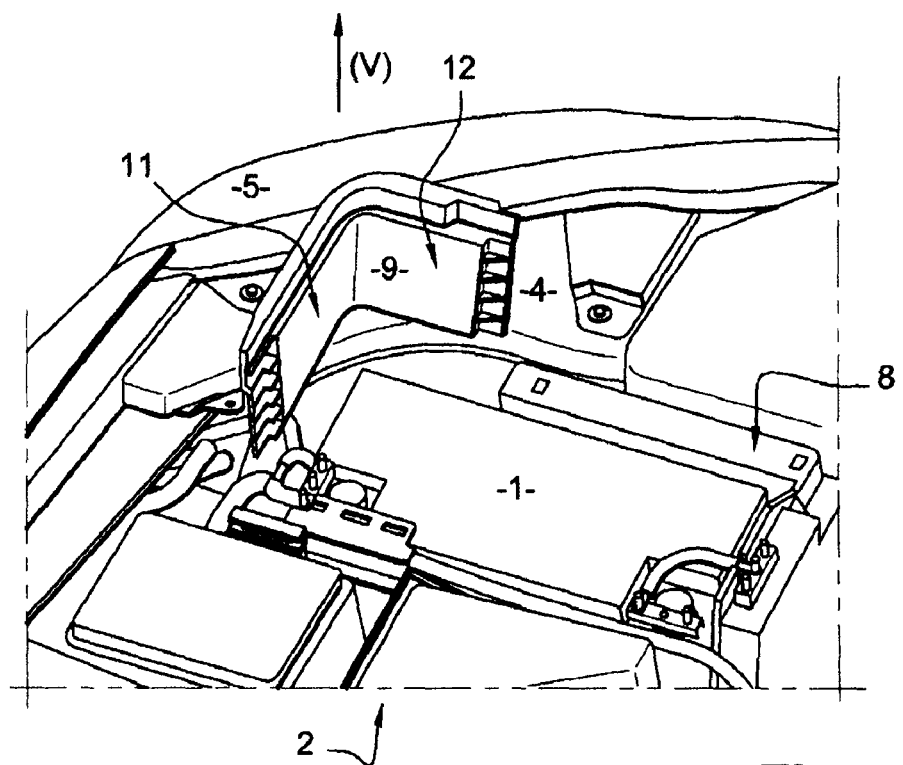
FIG. 5 is a detail view in perspective of the battery compartment of which the removable portion forming a partition of said compartment is in the disengaged position.

Advantageously, FIG. 3 illustrates the technical solution as claimed. In fact, the compartment 8 comprises a battery 1 which can be seen once the upper cover 10 is removed. The compartment 8 comprises a removable portion 9 located generally behind the rear openings 7 of each headlight as illustrated in FIGS. 3, 4 and 5. In the embodiment illustrated in the figures mentioned above, the removable portion 9 is connected to the compartment 8 by at least one slide rail (not illustrated) carried by the generally vertical pillars of the fixed portion of the compartment 8. This slide rail connection allows the removable portion 9 to undergo a generally vertical movement in the direction of the arrow V illustrated in FIG. 5.

According to another embodiment, any means equivalent to a slide rail connection is suitable for providing the movement described above. The sealing of compartment 8, through which a current of fresh air passes, at the bottom lower profile of the removable portion 9 is obtained by a groove (not illustrated) with a shape which is complementary to the removable portion 9. The sealing can be provided by any other equivalent means for performing the same function.

Figure 6:
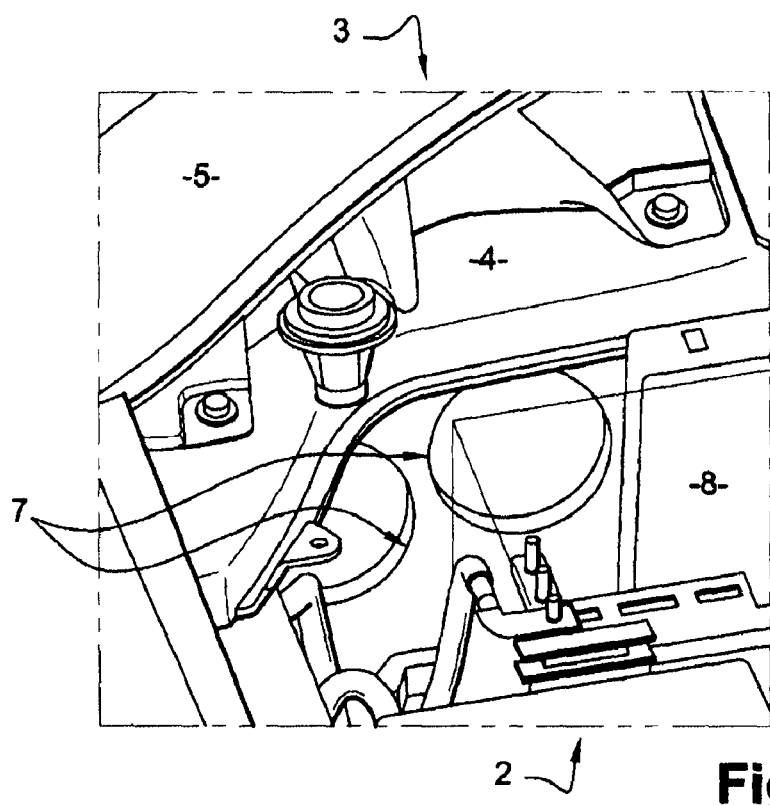
FIG. 6 is a detail view in perspective of the battery compartment accommodating the battery itself illustrated in outline and allowing the rear opening in the headlight unit to be seen when the removable portion is in the disengaged position.

FIG. 6 highlights the installation of the removable portion 9 in the compartment 8 and the positioning of it set back immediately behind the headlight unit 5. FIG. 5 illustrates the battery 1 in outline to show behind the removable portion 9 the rear opening 7 of the unit 5 for gaining access to the bulbs of the headlights. Once the removable portion is in the disengaged position, the user can freely gain access to the openings 7 to carry out the changes of bulbs required if these fail.

Advantageously, the present invention makes it possible to leave the battery compartment in place to be able to gain access easily to the openings 7. The shape of the removable portion 7 is, in this case, composed of at least one portion with two faces 11 and 12 of the compartment 8 connected to each other by one common edge. In other embodiments, not illustrated, the shape of the removable portion is composed of a single face or otherwise a portion of a face of the compartment 8 so as to solve the technical problem mentioned above.

The invention claimed is:

1. An arrangement for mounting an accumulator battery in a motor vehicle which comprises: a first body structure portion forming an engine compartment, wherein the first structure portion comprises at least two generally longitudinal and parallel side members and which is arranged to the rear of a second transverse structure portion forming a front fender of the vehicle, wherein the transverse structure portion comprises at least one front crossmember connected to the side members and supporting at each of its ends a headlight unit of which bulbs are accessible from the engine compartment by at least one opening and in which a compartment accommodating the accumulator battery is located to the rear of this opening, wherein the compartment for the accumulator battery comprises a removable portion allowing access to the opening in the headlight unit from the engine compartment to change dead bulbs while keeping the accumulator battery compartment in place.

2. The arrangement as claimed in claim 1, wherein the compartment for the accumulator battery is generally parallelepipedic in shape, to which is attached an upper cover through the top of the first structure portion forming an engine compartment.

3. The arrangement as claimed in claim 2, wherein the removable portion is composed of at least one generally vertical face of the accumulator battery compartment.

4. The arrangement as claimed in claim 2, wherein the removable portion is composed of at least one portion with two faces connected to each other by one edge of the parallelepipedic compartment for the accumulator battery.

5. The arrangement as claimed in claim 1, wherein the removable portion of the compartment for the accumulator battery moves from an engaged position to a disengaged position by a generally vertical sliding movement toward the top of the vehicle and is replaced in position on the accumulator battery compartment by a generally vertical sliding movement toward the bottom of the vehicle.

6. The arrangement as claimed in claim 1, wherein the removable portion is mounted on at least one slide rail supported by one of generally vertical pillars of a fixed portion of the compartment for the accumulator battery.

7. The arrangement as claimed in claim 5, wherein the compartment for the accumulator battery comprises in its lower portion a groove accepting a profile of the removable portion, the assembly providing the sealing of the accumulator battery compartment when the removable portion is in an engaged position.

8. A method for changing a bulb of a headlight unit in which a compartment for an accumulator battery as claimed in claim 1 is positioned close behind the headlight unit of a motor vehicle, the method comprising:
 opening the hood of the vehicle;
 removing the upper cover of the compartment for the accumulator battery providing sealing of the compartment;
 sliding the removable portion of the battery compartment in at least one of slide rails of vertical pillars of the compartment with a generally vertical movement;
 unblocking the opening in the headlight unit from the rear of the transverse structure;
 changing one of the bulbs in the headlight unit from the opening; and
 carrying out all of the preceding operations in reverse order to return to an initial state.

* * * * *